G. M. HARNISCH.
Trace-Buckle.
No. 217,098. Patented July 1, 1879.
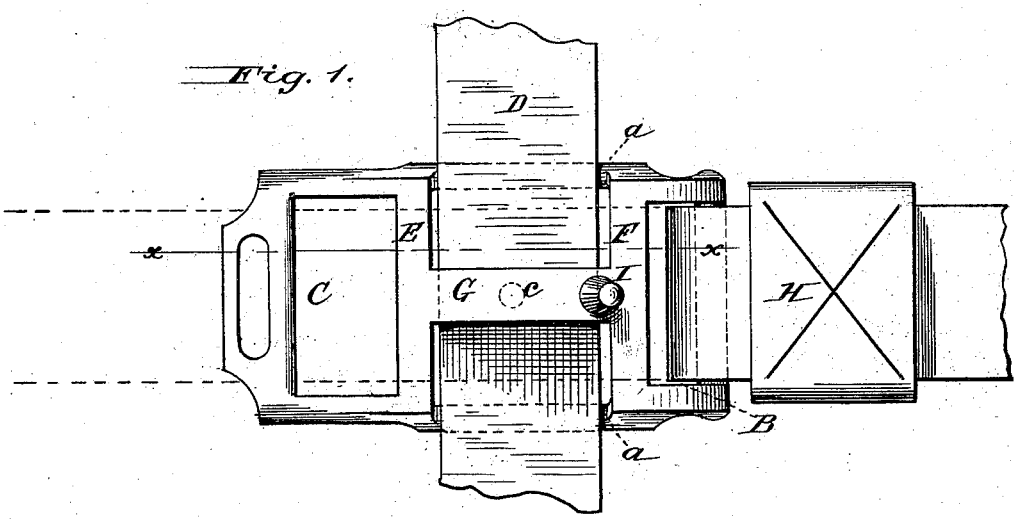
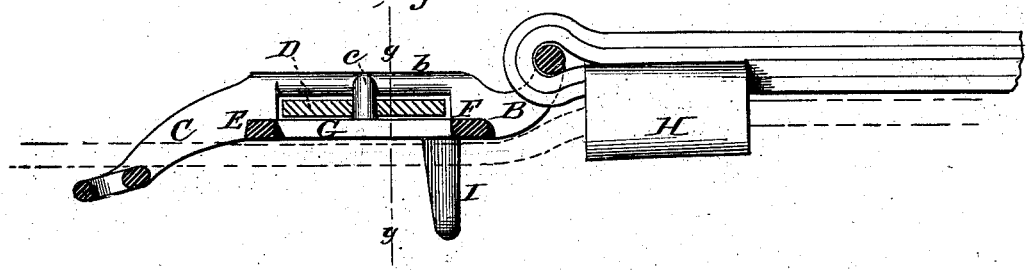
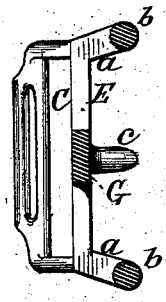 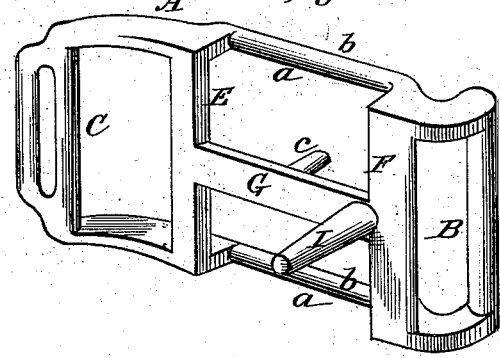
Attest:
H. L. Perries
Floyd Norris
Inventor.
Geo. M. Harnisch
By Johnson & Johnson
Atty's.

UNITED STATES PATENT OFFICE.

GEORGE M. HARNISCH, OF BEECHER, ILLINOIS.

IMPROVEMENT IN TRACE-BUCKLES.

Specification forming part of Letters Patent No. 217,098, dated July 1, 1879; application filed May 16, 1879.

*To all whom it may concern:*

Be it known that I, GEORGE M. HARNISCH, of Beecher, in the county of Will and State of Illinois, have invented certain new and useful Improvements in Trace-Buckles, of which the following is a specification.

This invention is an improvement upon the trace-buckle patented to me July 6, 1869, under No. 92,188, to which reference is made; and my said improvement looks to a construction much simpler and better for the purpose of a combined trace-buckle and trace-holder.

In the accompanying drawings, Figure 1 represents a side view of the buckle-frame and its accompanying straps as laid out flat, or as the thing would appear upon the horse's side; Fig. 2, a longitudinal section; Fig. 3, a cross-section, and Fig. 4 a perspective of the buckle-frame.

The buckle-frame A is a single casting, made with tug and trace loops B C; but it differs from my patented trace-buckle frame and from others in the particulars of having a novel connection for the trace and for the belly-band and back or saddle connecting-strap D for supporting the trace. There are two outside cross-bars, E F, connected by a middle longitudinal bar, G, under which latter the trace-supporting strap D passes through a depression made by sinking the buckle-frame at $a$ $a$, so as to leave a through-space back of the bar G, and between it and the sides $b$ $b$ of the frame. At or about the junction of bar G with cross-bar F, and near the tug-loop, there is a fixed tongue, I, which passes through one of the trace-holes, the free end of the trace then passing under the keeper H of the tug, as shown, the tongue I and the loop H' having such relation as to hold the trace upon said tongue.

Upon the inner side of the connecting-bar G is a stud, $c$, which, projecting in the space formed by the depressions $a$ $a$, engages with any one of the holes of strap D, and thereby holds the trace up, so that the holding-strap D and the trace are secured by fixed tongues or studs on opposite sides of the cross-bar G, which carries both the trace-holding tongue I and the trace-supporting stud $c$, connecting the back-strap, said studs projecting both inward and outward from said cross-bar.

I claim—

The buckle-frame A, made with loops, as described, and with depressions $a$ $a$, cross-bars E F, and longitudinal connecting-bar G, provided with fixed tongue I on its outer side, and stud $c$ on its inner side, substantially as described.

In testimony whereof I have hereunto set my hand in the presence of two witnesses.

GEORGE M. HARNISCH.

Witnesses:
 EMIL WALTER,
 HERMAN ROHE.